United States Patent [19]

Armour

[11] 3,940,224
[45] Feb. 24, 1976

[54] CONSTANT VELOCITY MANIFOLD FOR INJECTION MOLDING MACHINE

[75] Inventor: Donald F. Armour, Bloomfield, Conn.

[73] Assignee: Package Machinery Company, East Longmeadow, Mass.

[22] Filed: Jan. 16, 1974

[21] Appl. No.: 433,879

[52] U.S. Cl. ................................. 425/247
[51] Int. Cl.² .............................. B29F 1/00
[58] Field of Search .......... 425/247, 242, 248, 250, 425/245, 243, 249, 378 S; 222/482, 483, 485, 486, 487

[56] References Cited
UNITED STATES PATENTS

| | | | |
|---|---|---|---|
| 2,396,348 | 3/1946 | Sinclair et al. ................... | 425/245 X |
| 2,831,459 | 4/1958 | Smith .............................. | 425/242 X |
| 3,238,568 | 3/1966 | Barnett et al. ...................... | 425/449 |
| 3,381,336 | 5/1968 | Wells ................................ | 425/378 S |
| 3,520,026 | 7/1970 | Stidham ............................. | 425/242 |
| 3,822,856 | 7/1974 | Gellert ............................. | 425/247 X |
| 3,849,048 | 11/1974 | Bielfeldt et al. ................... | 425/247 |

*Primary Examiner*—Francis S. Husar
*Assistant Examiner*—R. J. Charvat
*Attorney, Agent, or Firm*—McCormick, Paulding & Huber

[57] ABSTRACT

A plastic injection blow molding manifold has progressively smaller passageways defined at the mating surfaces between its two primary members. The circular cross sectional inlet area is reduced by one-half in a first cross passageway, and then further reduced in two additional cross passageways in an eight nozzle version. All of these cross passageways are defined at said mating surfaces, and the respective ends of such additional cross passageways communicate with paired outlets, each of which outlets has an associated nozzle and coaxially arranged heating element.

2 Claims, 4 Drawing Figures

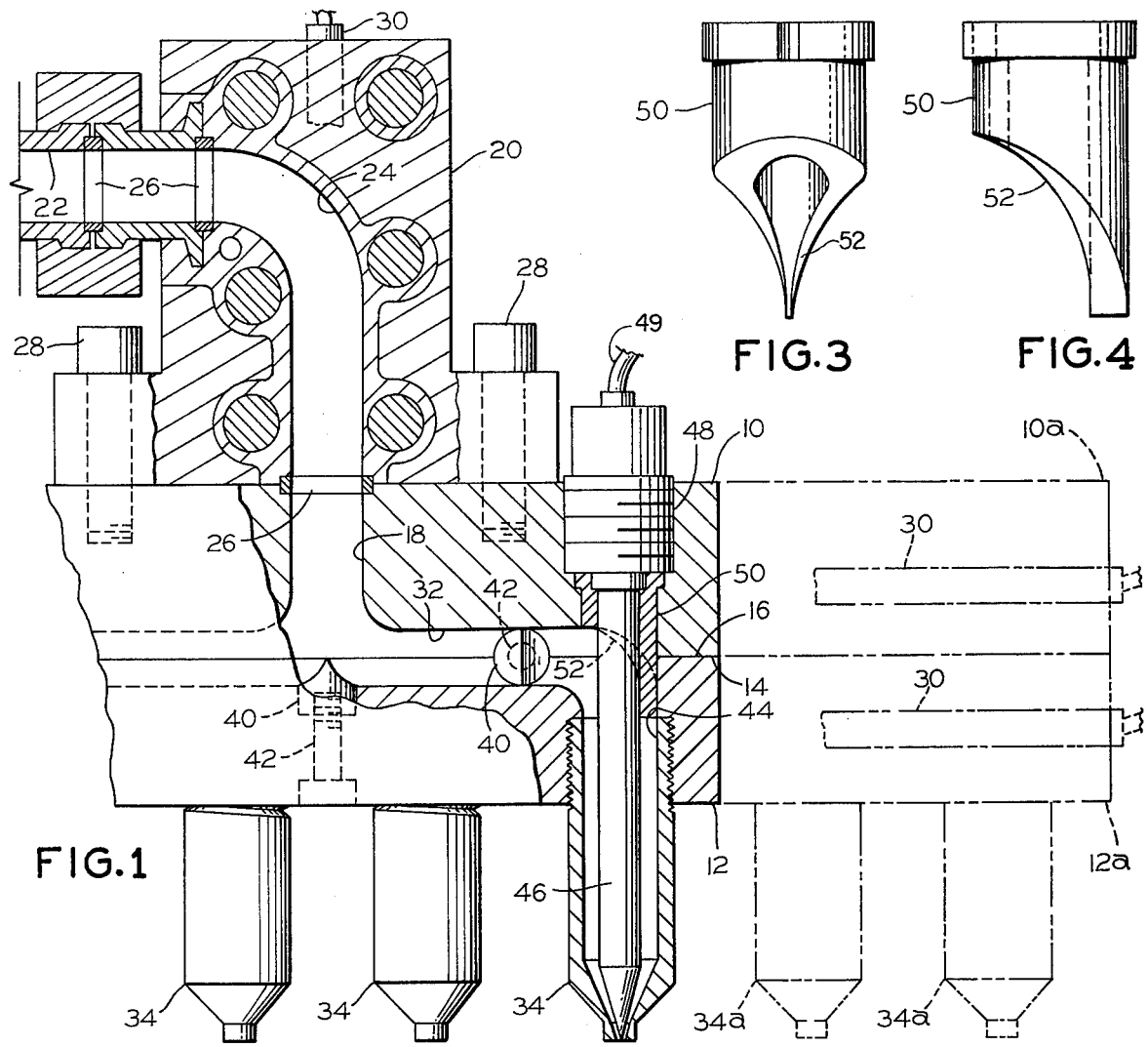
FIG.3  FIG.4
FIG.1
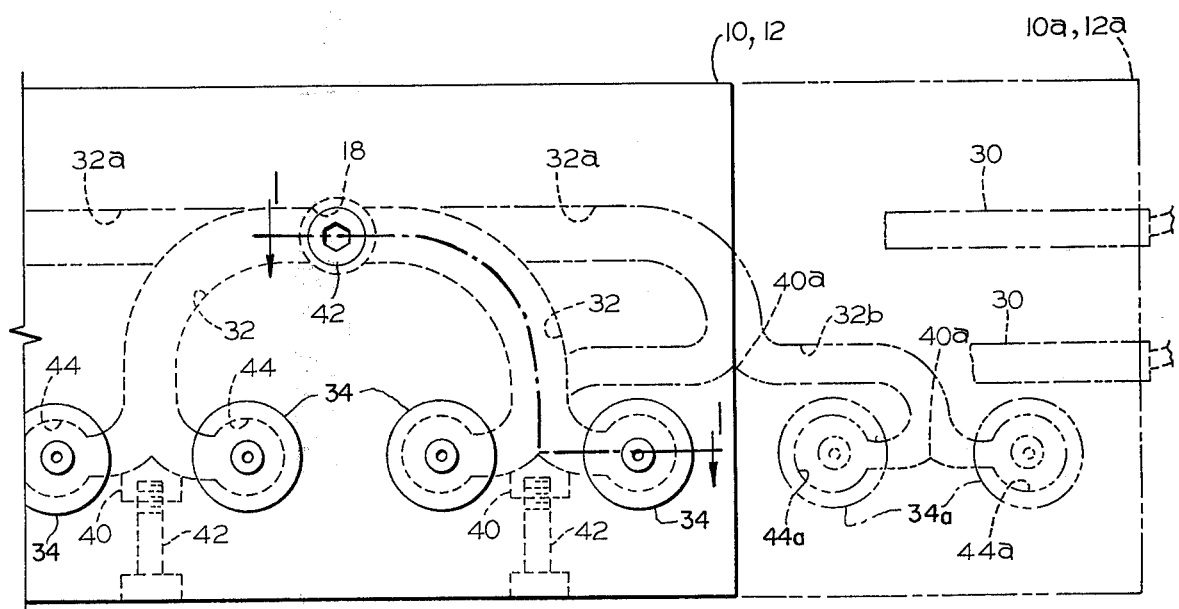
FIG.2

CONSTANT VELOCITY MANIFOLD FOR INJECTION MOLDING MACHINE

BACKGROUND OF INVENTION

This invention relates generally to a plastic injection manifold for dividing an incoming stream of molten material, which material is thermally degradable plastic, into a plurality of smaller streams for delivery to several individual molds. More specifically, this invention relates to a manifold structure so designed as to maintain a constant velocity of all the material being handled at a particular time whereby the temperature thereof can be more closely controlled than has been possible heretofore.

The increasing use of plastic materials, especially in the container industry, has created a need for a moldable material capable of withstanding the extreme environmental conditions to which containers of glass and other materials have been subjected. Efforts to develop such materials have led to the introduction of materials which are characterized by higher melting points than have been encountered heretofore. For example, molten polyvinylchloride (PVC) can be handled in prior art manifolds at temperatures of less than 400°F if the pressure in the manifold is kept sufficiently high. This material degrades at approximately 500°F, so that the PVC manifold need only keep the molten material at 400°, ±50°F in order to provide for the efficient handling of the PVC in such manifolds and also to prevent it from degrading.

Newer plastics have been developed, especially for the container industry, from acrylics and nitriles, which materials still degrade at approximately 500°F, but which can only be caused to flow at reasonable pressures at temperatures on the order of 450°F or higher. Thus, a manifold structure suitable for handling such materials must be capable of maintaining all of the material in such manifold at a temperature which is necessarily closely controlled. For example, the temperature of this material must be held between narrow limits, such as 475°, ±10°F. The chief aim of the present invention is to provide a manifold structure which will permit maintaining this degree of control over the temperature of all of the material being handled in the manifold.

Prior art manifolds have been designed to handle plastics, such as PVC, by increasing the pressure so that the material can be forced through the manifold's passageways at lower temperatures. This approach has obvious disadvantages in the handling of PVC, and becomes impractical in the handling of the more critical acrylics and nitriles.

The general aim of the present invention is to provide a manifold so designed that all of the plastic material is moved through all of its passageways at a velocity which is kept constant throughout the manifold at least at any one time during the cycle of operation of the injection molding machine. Sharp corners and any protuberances in these passageways are carefully avoided to decrease friction, and the cross sectional area of each passageway or branch is progressively reduced between the inlet and the plurality of outlet nozzles to keep the instantaneous speed of every particle of material in the manifold at a level which is the same as every other particle.

SUMMARY OF INVENTION

A manifold structure capable of realizing the foregoing objects can be fabricated from two manifold members having mating surfaces in which internal passageways are machined to define at least one generally arcuate cross passageway, the midpoint of which communicates with the inlet and simultaneously turns the incoming stream through 90°, and splits it into two smaller streams. Flow splitting passageway defining means at the symmetrically arranged ends of said cross passageway further divide the flow and feed the individual outlet nozzles, and all of said passageways are defined at the interface between said mating manifold members.

BRIEF DESCRIPTION OF DRAWINGS

FIG. 1 is an elevational view, with portions broken away to reveal in vertical section the internal arrangement of one-half of a generally symmetrical manifold structure incorporating the present invention. The phantom lines show a slightly different version capable of servicing two additional nozzles on the right-hand side of the four nozzle version shown in solid lines.

FIG. 2 is a bottom view of the FIG. 1 manifold, also showing in phantom lines the alternative version depicted in that view for servicing eight nozzles.

FIG. 3 is an end view of the collar shown in FIG. 1.

FIG. 4 is an elevational view of the collar.

DETAILED DESCRIPTION

Referring to FIG. 1, there is shown a four nozzle manifold structure in solid lines which incorporates the present invention, and which manifold is suitable for use between a conventional screw-type feedeer (not shown) and the individual molds (not shown) of a conventional injection blow molding machine of the type adapted to form individual parisons which are thereafter blown into hollow articles such as containers or the like. The additional structure shown in phantom lines shows the adaptations necessary to feed eight nozzles in a larger machine of the same type.

The manifold structure to be described is particularly useful in the handling of plastic materials which are characterized by the need for critical control of their temperature in order to prevent thermal degradation on the one hand, and in order to permit their passage through the manifold at reasonable pressures on the other hand. Typical of such materials is LOPAC sold by Monsanto; XR-16 sold by DuPont; and Vistron's BAREX. However, the advantages to the present invention can also be realized in the handling of conventional polyvinylchloride (PVC) or the like. Such materials can be advantageously handled by the manifold structure of the type described herein.

Basically, the manifold structure comprises at least two manifold members 10 and 12 which members have mating surfaces as indicated generally at 14 and 16, respectively, and which members 10 and 12 are securely fastened together preferably by suitable bolt means (not shown). Each of these members 10 and 12 is generally rectangular in configuration and the upper member 10 defines an inlet opening 18 of circular cross section, which opening is vertically oriented and generally of linear configuration as best shown in FIG. 1. This inlet 18 receives a stream of molten material from the feeder (not shown) through a superstructure 20 which is adapted to turn the stream of molten material from its initial horizontal direction as it enters the intake 22 through 90° to a vertically downwardly oriented direction aligned with the inlet opening 18 in the manifold member 10. When a superstructure 20 is used, it is an important feature of the present invention that the radius of curvature of the passageway 24 be large enough to efficiently turn the stream of molten material with a minimum of friction. The cross sectional area of the passageway 24 in the superstructure 20 is identical to that of the inlet passageway 18 in the upper manifold member 10, and an annular insert 26 is preferably provided to avoid any sharp corners at the interface between the superstructure 20 and the upper manifold member 10. Similar inserts 26, 26 may be provided in the area of the intake opening 22 of the superstructure 20. The superstructure 20 is bolted to the upper manifold member 10 as indicated generally at 28, 28 and a heating element of conventional construction is shown generally at 30 for maintaining the desired temperature of the material as it passes through the arcuate passagway 24 of the superstructure 20.

As best shown in FIG. 2, the vertically oriented linear inlet passageway 18 communicates with the midpoint of a generally arcuate cross passageway 32 defined in part by an arcuate semi-circular groove in the upper manifold member 10 and a matching groove defined in the lower member 12. It is an important feature of the present invention that the cross passageway 32, like the inlet passageway 18, also be of circular cross section, and that said cross passageway 32 have a cross sectional area which is one-half that of the inlet passageway 18. The midpoint of this cross passageway 32, and more particularly in that portion defined by said lower manifold member 12, a flow splitting device 40 is provided to split the flow from the inlet 18 into two streams in the symmetrically arranged cross passageway's two branches. As shown the device 40 comprises a nut which is threadably received on a screw 42 in the lower manifold member 12.

Flow splitting passageway defining means is provided at the ends of said cross passageway 32 for connecting at least two nozzles 34, 34 to an associated end of said cross passageway. The cross passageway 32 can be seen from FIG. 2 to be symmetrical about its midpoint, and to have an arcuate center line which is located in a flat plane defined by the mating surfaces 14 and 16 of the manifold members 10 and 12, respectively. Still with reference to FIG. 2, the flow splitting means at the downstream ends of the cross passageway 32 preferably includes a nut 40 held in a suitable receptacle defined at the surface 16 by a screw 42 similar to the screw 42 and conical nut 40 associated with the junction between the inlet passageway 18 and the cross passageway 32 of FIG. 1.

Each nozzle 34 comprises an annular member which is threadably received in the lower manifold member 12 as best shown in FIG. 1, which nozzle 34 has an internal bore adapted to correspond to the circular cross section of its associated outlet passageway 44. Two such outlet passageways 44, 44 are associated with each of the flow splitting passageway defining means mentioned in the preceding paragraph, and thus, each outlet passageway has an effective cross sectional area reduced by a factor of two from that of its associated cross passageway 32 as best shown in FIG. 1. The outlet passageway 44, 44 associated with each of the nozzles 34, 34 are in fact linearly oriented and generally parallel to the inlet opening 18, although offset therefrom as shown in FIG. 2. These outlet openings 44, 44 are thus parallel to one another and defined in part by the lower manifold member 12 and in part by the internal bore of the associated nozzle 34. Their effective cross sectional area is reduced from that of the cross passageway 32 as mentioned above, and in fact a cylindrical heating element 46 extends downwardly into each associated outlet passageway 44 and into its associated nozzle so as to provide an annular cross sectional area for each of the outlet passageways 44. These heating elements 46 are of conventional construction, and each includes an associated thermocouple for sensing the temperature of the molten material in its associated nozzle. A threaded base portion 48 of each element 46 is received in a threaded opening provided for this purpose in the upper manifold member 10, and the thermocouple lead out wires and electrical power for the internal heating element are all contained in an electrical conduit 49. A faired collar 50 is provided for the shank portion of each of these heating elements 46, and said collar 50 is of generally annular cross section as best shown in FIG. 3. As best shown in this view and in FIG. 4 the collar 50 includes a depending fillet portion 52 at the junction between said flow splitting passageway defining means and said outlet passageway in order to minimize the impedance offered to the flow of molten material as it is channeled from the cross passageway 32 into the outlet passageways 44, 44.

By way of summary then, the path taken by the molten material from the intake 22 associated with the superstructure 20 as it passes through the internal passageways of the manifold to be ejected from the nozzles 34, 34 can be seen to be one which is of progressively reduced cross sectional area and hence one which assures that the velocity of the material is kept constant at all points in the manifold, at least at any particular instant of time. In addition, the generous radius of curvature, as indicated generally at 24 for the superstructure 20, and also as indicated in FIG. 2 for the cross passageway 32, together with the use of devices such as the flow splitting nut 40 and the faired collar 50 assure that no sharp corners are encountered by the material as it passes through the manifold. Thus, the manifold of the invention has very little resistance to the flow of the molten material and all of the foregoing contribute to the favorable results mentioned previously for a constant velocity manifold in that the degradation of the plastic material is effectively prevented by controlling the time period when each particle of molten material is in contact or is located in the passageways of the manifold itself. The manifold is so configured that the molten material approaching a 90° turn or intersection will not impinge against the opposite wall and tend to build up a mound or area of non-flowing material as is true of many prior art manifold designs. Each intersection provided in the manifold described above effectively splits the flow equally in both directions so as to keep the flow moving at the same rate of speed. By providing equal rates of flow throughout the manifold structure, the pressures available at each of the individual nozzles is effectively kept constant, hence a balanced manifold system is provided.

Turning next to the alternative manifold structure depicted in phantom lines in FIGS. 1 and 2, one-half of a cross passageway 32a is depicted in FIG. 2 wherein the radius of curvature of the arcuate cross passageway is altered to feed a quantity of the molten material somewhat farther out laterally from its associated inlet 18 in order to feed an additional two nozzles 34a, 34a at the right-hand side of the manifold structure. It will, of course, be apparent that a similar configuration for the left-hand side of the structure is also required, and a symmetrical branch cross passageway 32a is provided at the left-hand side of the axis of symmetry defined by the inlet passageway 18 of FIG. 2. Still with reference to the alternative version shown in phantom lines in FIGS. 1 and 2, at least two additional cross passageways are provided, each of which has a cross sectional area of approximately one-fourth that of the inlet passageway 19. The first mentioned cross passageway 32a communicates at its midpoint with the inlet passageway 18, but the ends of the first cross passageway 32a do not communicate directly with the outlet passageway as in the previous embodiment, but rather with a second cross passageway 32b and more particularly with its midpoint in a manner similar to the intersection between the inlet passageway 18 and the cross passageway 32 associated with the first version described hereinabove. Each of the additional cross passageways 32b (one shown in FIG. 2) has its respective ends communicating with flow splitting passageway defining means similar to that described above. A flow splitting nut 40a is provided at each of these intersections in order to split the flow of molten material as it enters the associated outlet passageways 44a, 44a. Thus, each of the additional cross passageways 32b has each of its ends feeding at least two outlet passageways 44a and associated nozzles 34a. It is an important feature of the present invention, that the cross passageways 32, 32a and 32b are all defined at the interface between the upper and lower manifold members 10 and 12, or 10a and 12a, with the result that the fabrication of the arcuate passageway portions associated with each of these members is greatly facilitated. These passageways are conveniently fabricated by a conventional milling machine or the like, and the linear inlet and outlet passageways by a conventional drilling and reaming process. The intersections are also configured to reduce fluid friction by the use of novel flow splitting or turning devices such as the nuts 40, 40a and the collar 50 best shown in FIGS. 3 and 4.

I claim:

1. A manifold structure for dividing a stream of molten material for delivery to the several cavities of a molding machine, said manifold comprising:
   a. at least two manifold members one of which members defines an inlet passageway of circular sectional area (A), and at least one other manifold member defining a plurality (N) of outlet passageways,
   b. a plurality of nozzles carried by said other manifold member and communicating with said outlet passageways,
   c. said manifold members having planar mating surfaces which cooperate to define at least one circular cross passageway the midpoint of which cross passageway communicates with said inlet passageway to define two symmetrically arranged arcuate branches, the cross sectional area of said cross passageway branches being fractionally reduced from that of said inlet passageway inversely as related to the number (N) of such outlet passageways,
   d. flow splitting passageway defining means also defined in said planar mating surfaces for connecting at least two outlet passageways to said cross passageway, said outlet passageways oriented parallel to one another and adapted to receive said nozzles perpendicularly with respect to said planar mating surfaces,
   e. said cross passageways and flow splitting passageways providing equal length paths for said molten material to each of said outlet passageways, and
   f. a plurality of elongated heating elements mounted in said one manifold member and extending coaxially into said outlet passageways and into said nozzles, and a faired collar for each such heating element, each collar being of generally annular cross section and including a fillet portion at the junction between said flow splitting passageway defining means and said outlet passageways to minimize the impedance to the flow of molten material being channeled from one to the other of these passageways.

2. The manifold structure of claim 1 wherein said flow splitting means further includes at least two additional cross passageways each having a cross sectional area fractionally reduced from that of said inlet passageway and each having its midpoint in communication with the ends of said first mentioned cross passageway, said additional cross passageways having their respective ends communicating with said flow splitting passageway defining means and being defined at the mating surface of said two manifold member all of said passageways providing equal length paths for said molten material to each of said outlet passageways.

* * * * *